(12) United States Patent
Wong (10) Patent No.: US 6,236,715 B1
(45) Date of Patent: *May 22, 2001

(54) METHOD AND APPARATUS FOR USING THE CONTROL CHANNEL IN TELECOMMUNICATIONS SYSTEMS FOR VOICE DIALING

(75) Inventor: Chi Wong, Palo Alto, CA (US)

(73) Assignee: Nortel Networks Corporation (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/842,605

(22) Filed: Apr. 15, 1997

(51) Int. Cl.$^7$ .................................................. H04M 3/493
(52) U.S. Cl. ................................ 379/88.03; 379/88.01; 379/88.1
(58) Field of Search ............................ 379/88.01, 88.02, 379/88.03, 88.04, 88.07, 88.1, 88.17; 704/270, 275; 370/524; 455/563

(56) References Cited

U.S. PATENT DOCUMENTS

| 4,348,550 | 9/1982 | Pirz et al. . | |
|---|---|---|---|
| 4,852,170 | * 7/1989 | Bordeaux | 704/277 |
| 4,959,850 | 9/1990 | Marui | 379/58 |
| 4,959,854 | * 9/1990 | Cave et al. | 379/157 |
| 5,007,081 | 4/1991 | Schmuckal et al. | 379/354 |
| 5,027,406 | * 6/1991 | Roberts et al. | 381/43 |
| 5,042,063 | 8/1991 | Sakanishi et al. | 379/88 |
| 5,097,509 | 3/1992 | Lennig | 381/43 |
| 5,165,095 | * 11/1992 | Borcherding | 379/216 |
| 5,222,121 | 6/1993 | Shimada | 379/88 |
| 5,475,792 | 12/1995 | Stanford et al. | 395/2.42 |
| 5,488,652 | 1/1996 | Bielby et al. | 379/88 |
| 5,497,446 | 3/1996 | Aso | 395/2.1 |
| 5,515,475 | 5/1996 | Gupta et al. | 395/2.51 |
| 5,577,117 | 11/1996 | Rabipour et al. | 379/414 |
| 5,594,784 | * 1/1997 | Velius | 379/216 |
| 5,845,245 | * 12/1998 | Gupta et al. | 704/231 |
| 5,878,117 | * 3/1999 | Minakami et al. | 379/88.01 |
| 5,905,773 | * 5/1999 | Wong | 379/88.03 |
| 5,912,949 | * 6/1999 | Chan et al. | 379/88.01 |

OTHER PUBLICATIONS

Publication entitled "State of the Art in Continuous Speech Recognition," Voice Communication Between Humans and Machines, (D. Roe and J. Wilpon eds., Nat'l Academy Press 1994), by John Makhoul and Richard Schwartz, pp. 165–198.

* cited by examiner

*Primary Examiner*—Scott L. Weaver
(74) *Attorney, Agent, or Firm*—Finnegan, Henderson, Farabow, Garrett & Dunner L.L.P.

(57) ABSTRACT

A voice-dialing apparatus and method extracts semantic features from a speech signal and transmits a set of semantic feature characteristics over a telecommunication control channel to a remote speech recognition processor. Once received, the remote speech recognition processor uses the feature set to retrieve a name and number corresponding to the audio signal received from the user and to automatically dial the number for the user.

28 Claims, 5 Drawing Sheets

METHOD AND APPARATUS FOR USING THE CONTROL CHANNEL IN TELECOMMUNICATIONS SYSTEMS FOR VOICE DIALING

BACKGROUND OF THE INVENTION

Generally, this invention relates to the field of automatic speech recognition technology, and in particular, to an apparatus and method for transmitting speech signals over a control channel in a telecommunications system to initiate calls.

Conventional telephone systems use speech recognition technology to enable voice-activated dialing services and voice-activated directory assistance. With these systems, a directory receives a spoken name, a speech recognition process recognizes the received name, and system elements use the recognized name to find the corresponding telephone number. Once the number is located, a call is then launched to the desired destination. Longstanding problems with such systems, however, have limited their performance in terms of both accuracy and computational speed. Further, to ensure the most accurate speech recognition, conventional systems and methods must transmit the entire speech signal "in-band," which requires telecommunication data channels due to the high bandwidth.

In conventional telephone networks, control, or signaling, channels transmit control information for establishing terminal links (session set-ups), terminating terminal links (session tear-downs), etc. In contrast, data channels carry data, or media type, signals such as voice and video transmissions. Control channels operate at a much lower data rate than the data channels because the control information requires less bandwidth than media type data signals. In most cases, signaling information is transmitted over a control channel around 8 or 16 Kbps, while data information is transmitted around 64 Kbps. In addition, data channels occupy a greater portion of a communication line's capacity, and thereby limit the number of calls a particular transmission line can accommodate.

Other speech recognition systems perform the entire speech recognition process locally and dial a number based on the result. These systems use a telephone terminal that can perform the three basic stages of speech recognition: feature extraction, pattern classification, and decision logic. In the first stage, relevant characteristics of the speech signal are extracted. The later stages use the extracted features to correlate the spoken name with a previously stored name template. A database lookup is then performed to retrieve a telephone number corresponding to the recognized name.

Systems employing this solution are currently expensive and impractical to implement. One drawback of such systems is that every telephone terminal capable of providing full speech recognition must be able to perform the entire speech recognition process locally before setting up or initiating a call. This requirement forces the terminal to contain both the hardware and software to perform all three phases of the speech recognition process.

The terminal also requires access to a database of recognizable names or speech patterns. The more names the speech processor can recognize the greater and more practical the benefit to the individual user. In the past, this goal has been accomplished by allowing the user to train the speech processor to recognize certain speech patterns and recalling these patterns when a voice-dialing request was made. Alternatively, preprogramming the processor with a number of "templates" allows multiple users to implement voice-dialing from the same terminal. The resulting terminal in both scenarios, however, is expensive and usually has limited voice recognition capabilities.

Other solutions have been proposed to overcome the problems associated with local speech recognition. For example, U.S. Pat. No. 5,488,652 (Bielby et al.) discloses a method and apparatus for training a speech recognition algorithm for directory assistance applications. This allows terminal users to send their voice-activated dialing requests to a remote speech recognition server. With the system disclosed in Bielby et al., the user speaks a name into a receiver at a standard terminal interface and, upon receiving the speech/voice signal, the remote server performs the entire speech recognition process and initiates the desired call. That system, however, requires a high-bandwidth data channel to transmit the speech signal received from the user.

In addition to transmitting the entire speech signal in-band over the data channel, systems such as Bielby et al. require the call to be "set-up" through an analog channel bank or digital interface prior to processing the call information. Call set-up is a procedure used between the call routing switch and the telephone terminal elements. The procedure uses a protocol and switching mechanism that operate jointly to negotiate the set-up and establish the connection between parties. For example, if A places a call to B, A would send a call-request message to the switch with B as the destination number. The switch would then check the status of B and, if B is not busy, send a call-initiate message to A (at which point A hears ringing) and a call-setup message to B (at which point B's phone starts ringing). When B pickups up, a call-accept message is sent from B to the switch. At this point, the switch completes the connection, switching the call, and changes its internal state to show that both A and B are busy.

In digital telephone systems, digital interfaces such as T1, DS30, or other proprietary mechanisms, provide the protocol and switching mechanisms necessary for call set-up between the user and the remote speech processor. Normally, call set-up is required to establish a complete connection because the remote processor needs the entire speech signal before speech recognition can occur.

In the alternative, allowing a user to transmit voice-activated dialing requests "out of band," over a lower bandwidth control channel, would eliminate the need for the call to be setup prior to the speech recognition process. As a consequence, the digital interface between the user and the speech recognition processor could also be eliminated, which in turn would result in significant cost and equipment savings.

SUMMARY OF THE INVENTION

Voice-activated dialing systems and methods consistent with the present invention can improve efficiency and effectiveness by performing a feature extraction procedure locally at the telephone terminal. In addition, the signal produced by the feature extraction procedure can be transmitted at a lower bandwidth on the control, or signaling, channels of the telephone system, thereby eliminating interface equipment normally required to set-up a call before the speech recognition process occurs.

A voice-activated dialing method consistent with this invention, includes the steps of: receiving, at a telephone terminal, an audio signal corresponding to a desired destination; conditioning the audio signal to extract a set of semantic feature characteristics; forming a feature signal representing the semantic features characteristic of the received audio signal; transmitting the feature signal to a remote speech recognition processor; and retrieving, with the remote speech recognition processor, a name corresponding to the feature signal.

A telephone terminal apparatus consistent with this invention, includes means for receiving an audio signal corresponding to a desired destination; means for conditioning the audio signal to extract a set of semantic feature characteristics; means for forming a feature signal corresponding to the semantic features characteristic of the received audio signal; and means for transmitting the feature signal to a remote speech recognition processor.

Additional advantages of the invention will be set forth in part in the description that follows, and in part will be obvious from the description, or may be learned by practicing the invention. Both the foregoing general description and the following detailed description are exemplary and explanatory, and are intended to provide a further explanation of the invention claimed.

BRIEF DESCRIPTION OF THE DRAWINGS

The accompanying drawings are included to provide a further understanding of the invention and are incorporated in and constitute a part of this specification, illustrate embodiments of the invention and together with the description, serve to explain the principles of the invention.

In the drawings.

DETAILED DESCRIPTION OF THE PREFERRED EMBODIMENTS

Reference will now be made in detail to the present preferred embodiments the invention, examples of which are illustrated in the accompanying drawings. Wherever possible, the same reference numbers will be used throughout the drawings to refer to the same or like parts.

A. Voice-Dialing System

Figure 1:
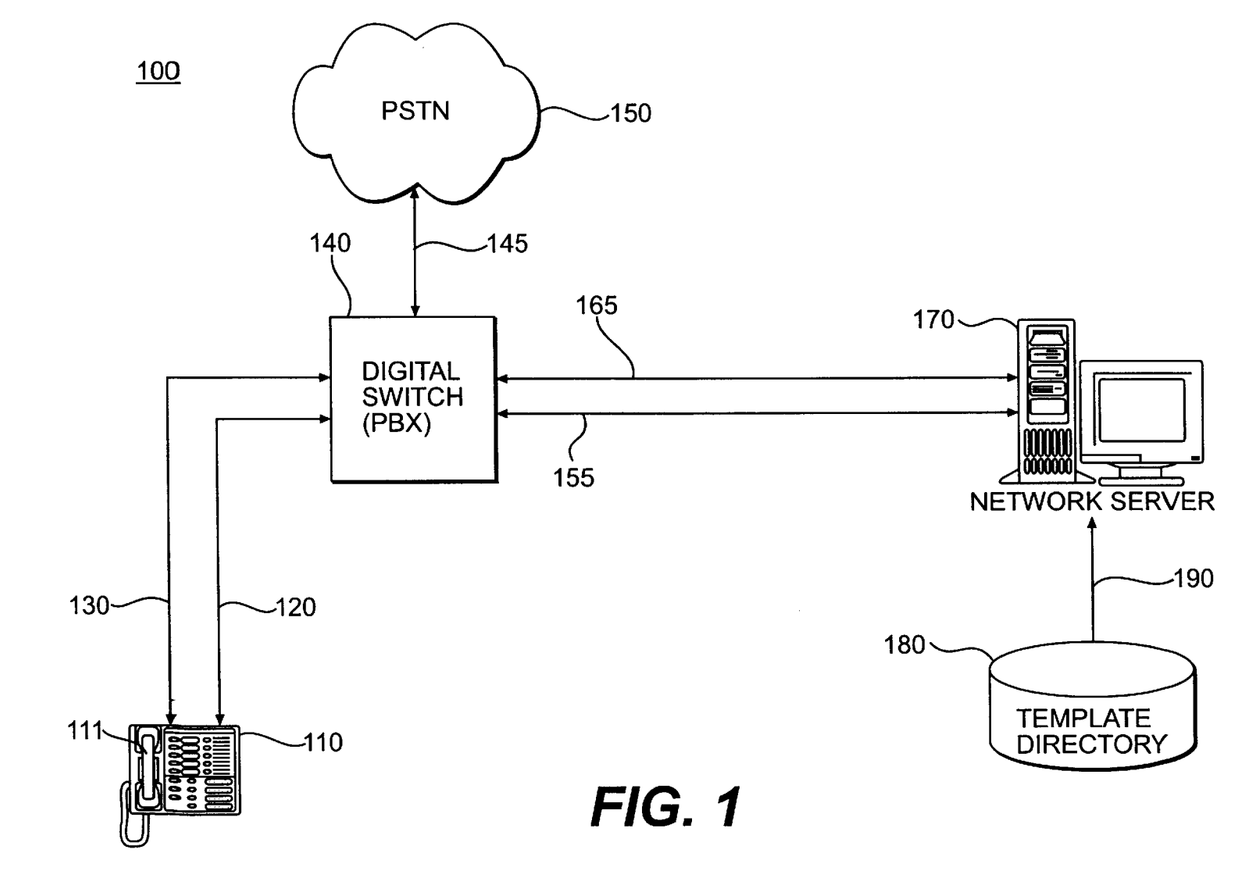
FIG. 1 is a block diagram of a voice-activated dialing system consistent with the present invention.

As seen in FIG. 1, voice-dialing system 100 includes at least one telephone terminal 110 for receiving an audio signal from a user and conditioning the signal to permit its transmission over telecommunication control channel 120. A common architecture found in telecommunication networks and interfaces separates the control channel from the data channel. In some cases the separation is not physically implemented but is controlled by the frequency or the time division multiplexing format of the data transmitted. For this reason, control channel 120 and data channel 130 may be located on the same physical communication line, with the signaling frequency or format of the information determining whether the information is a data or a control signal.

Telecommunication control channel 120 and data channel 130 connect terminal 110 to digital telecommunication switch 140. Those skilled in the art will recognize that digital telecommunication switch 140 may be any telecommunication switching system capable of providing the interface requirements of the present invention. For example, Northern Telecom's Meridian-1® PBX is one digital telecommunication switching system that may be used in conjunction with the present invention.

Line 145 connects digital switch 140 to public switched telephone network (PSTN) 150 and together, channels 120 and 130, digital switch 140 and line 145 are part of an Integrated Services Digital Network (ISDN), a system of digital phone connections that permits multiple calls to be transmitted and received between terminal 110 and PSTN 150. With this combination, voice and data signals are carried at a bandwidth of 56–64 Kbps, while control signals are carried at a bandwidth of either 8 or 16 Kbps.

Digital switch 140 is connected to a network server 170 via control channel 155 and data channel 165. These channels operate at the same bandwidths as control channel 120 and data channel 130, respectively. Network server 170 is a telephone platform server apparatus used to provide a variety of directory assistance and call routing functions for the voice-dialing system 100. Network server 170 contains conventional software and hardware necessary to perform the call routing functions, including a directory of names and corresponding numbers serviced by the network. In addition, network server 170 includes specifically designed algorithms to perform the speech recognition functions used by the present invention. To perform the speech recognition functions, network server 170 also includes, or is coupled to via data link 190, a speech recognition template directory 180. Directory 180 is a library of speech recognition templates representing a plurality of proper names or destinations serviced by system 100.

B. Terminal 110

Figure 2:
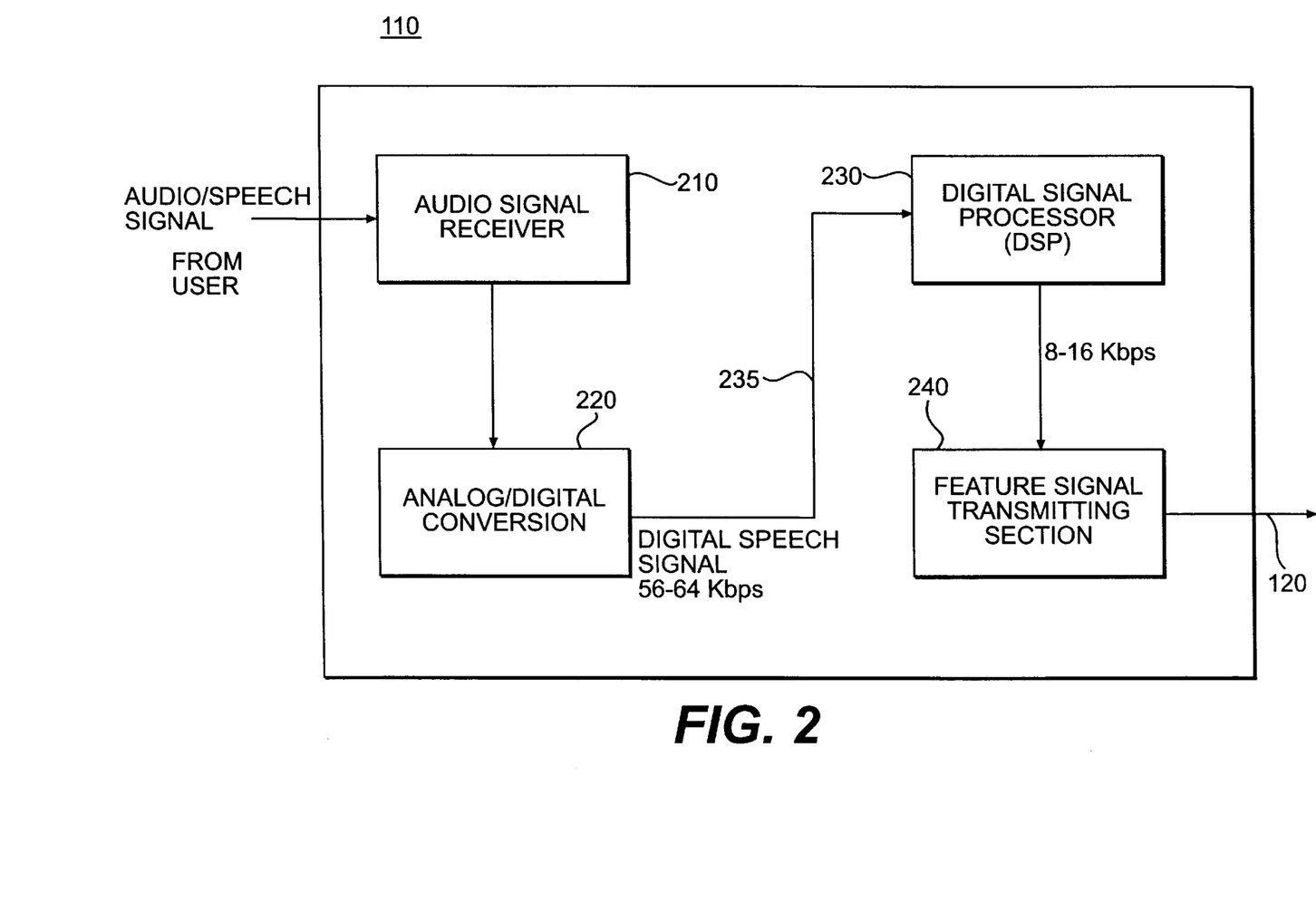
FIG. 2 is a block diagram of a telephone terminal shown in FIG. 1.

FIG. 2 is a block diagram showing further details of telephone terminal 110. Terminal 110 contains a receiving mechanism 210 for receiving an audio signal from a terminal user. Receiving mechanism 210 may be a conventional telephone handset 111, a microphone connected to an standard input port on terminal 110, or another equivalent device. Receiving mechanism 210 is connected to an analog to digital converter (ADC) 220 that converts a received analog audio or voice signal to a digital signal. ADC 220 may be any ADC device capable of providing a telephone quality digital speech signal.

ADC 220 is connected via data bus 235 to a digital signal processor (DSP) circuit 230 capable of performing conventional feature extraction techniques and signal compression. For example, a Texas Instrument Model No. TMS320C4X may be used in conjunction with conventional peripheral control components to perform the required functions of DSP circuit 230. DSP 230 is connected to a signal transmitting section 240 that transmits the output signal from DSP 230 over control channel 120 to network server 170 via digital switch 140 and control channel 155. The signal transmitted will be within the range consistent with the bandwidth requirements of a telecommunications control channel, either 8 or 16 Kbps.

C. Voice-Dialing Method

Figure 3A:
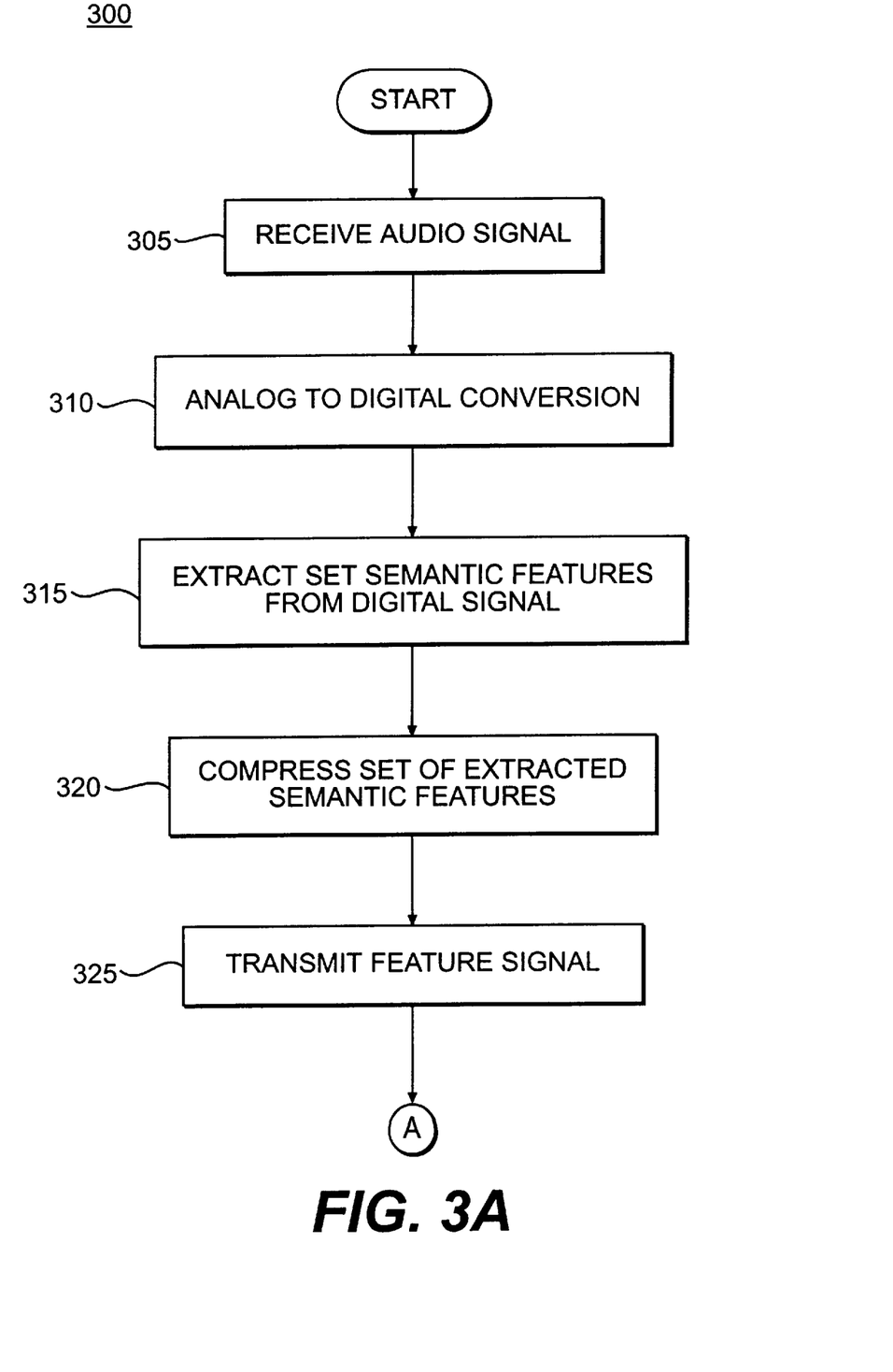
FIG. 3A is a flowchart showing the steps of extracting features for a voice-activated dialing procedure consistent with the present invention.
Figure 3B:
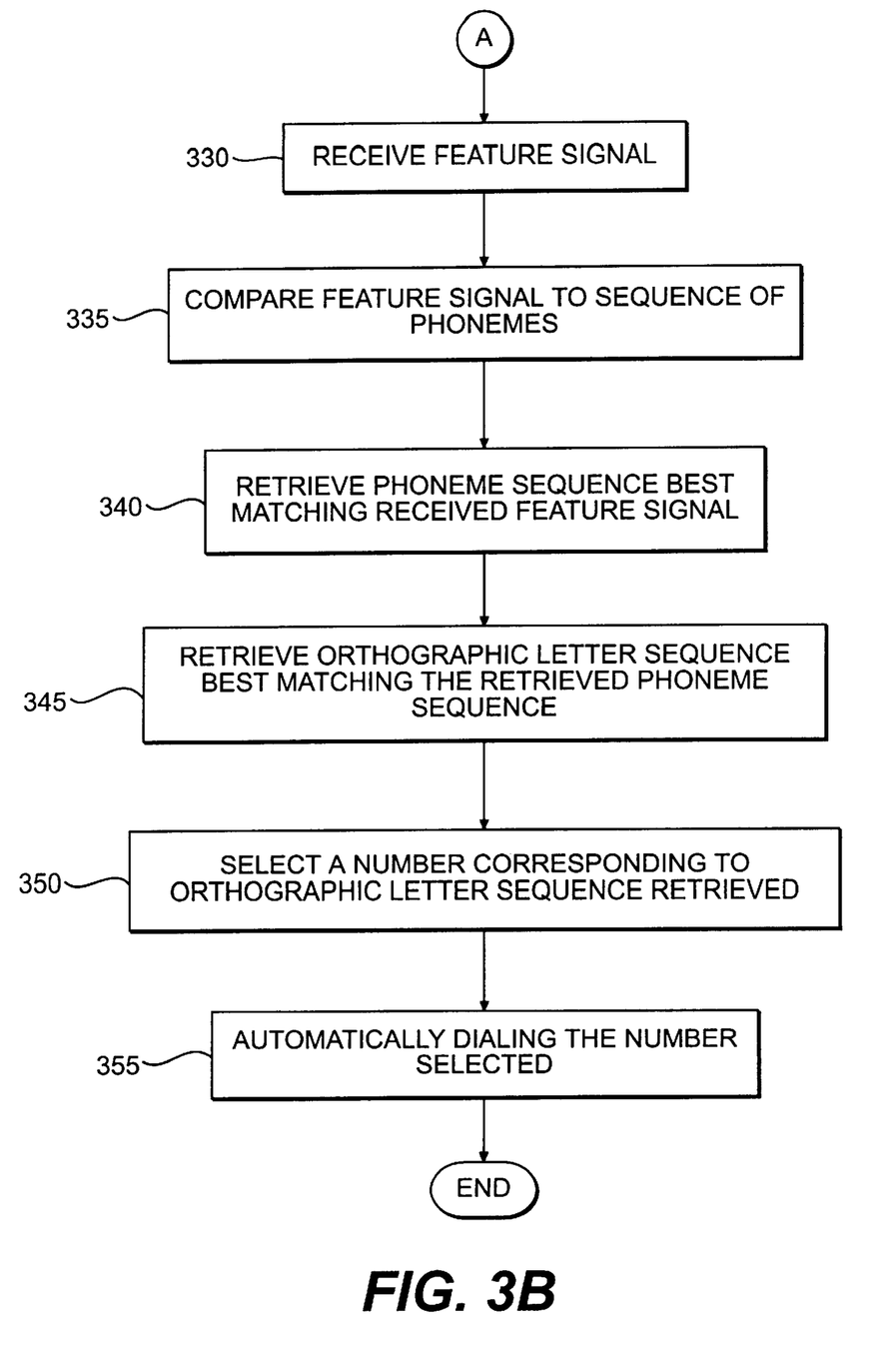
FIG. 3B is a flowchart showing the steps of automatically dialing a number based on the extracted features consistent with the present invention.

FIGS. 3A and 3B are flowcharts showing a voice-activated dialing procedure 300 used in conjunction with system 100 and terminal 110. First, at terminal 110, a user speaks a name corresponding to the user's desired calling destination, and this speech/audio signal is received at receiver mechanism 210. (Step 305) The user may input the audio signal through handset receiver 111 or through a microphone attached to terminal 110. The received audio signal is an analog voice signal within the normal bandwidth frequencies of human speech.

Next, ADC 220 converts the received audio signal to a digital signal. (Step 310) The digital signal output from ADC 220 will have a bandwidth consistent with telephone quality digital speech, between 56 and 64 Kbps. When DSP 230 receives the digital signal, it extracts a set of semantic feature characteristics representing the original audio signal received from the user. (Step 315) The feature extraction process essentially removes components that are unnecessary for automatic speech recognition purposes and leaves behind a signal made up of the essential, or semantic, speech components. In the English language, for example, among the components removed from the audio signal would be tone and pitch. accomplish the semantic feature extraction, DSP 230 can be programmed to perform any number of conventional feature extraction techniques generally used in conjunction with speech recognition algorithms. One technique, known as, mel-frequency cepstral coefficient (MFCC) extraction, subjects a digital signal spectrum to a mel-scale warping that maps the spectrum linearly from 0 to 100 Hz, and logarithmically thereafter. After mapping, an inverse Fourier transform is performed on the signal, and a cepstrum of the resulting coefficients are formed. By using this technique, DSP 230 can, for example, retain the first twelve coefficients for every 10 ms signal frame. Preferably, the resulting cepstral of coefficients, or semantic feature set, will accurately represent the original speech signal received from the user. A more detailed description of the feature extraction method consistent with that described above is disclosed in U.S. Pat. No. 5,097,509 (Lennig), and is hereby incorporated by reference. In addition to MFCC extraction, DSP 230 may be programmed to perform other feature extraction techniques, such as for example, the linear predictive coding method described in J. Markhoul and R. Schwartz, "State of the Art in Continuous Speech Recognition," Voice Communication Between Humans and Machines, (D. Roe and J. Wilpon eds., Nat'l Academy Press 1994), pp. 165–198.

Once the set of semantic feature characteristics are extracted from the digital signal, DSP 230 compresses the feature set to form a feature signal for transmission over telecommunication control channel 120. (Step 320) The resulting feature signal will have a bandwidth under 8 Kbps or 16 Kbps depending on the bandwidth of the particular control channel 120. Feature signal transmitting section 240 then transmits the signal to network server 170 via control channel 155 and digital switch 140. (Step 325)

With reference to FIG. 3B, network server 170 receives the feature signal (Step 330), and uses the feature signal as an input for a speech recognition process stored within the network server 170. Network server 170 accesses template directory 180 and compares the received feature signal to speech recognition templates stored in directory 180. (Step 335)

Preferably, template directory 180 contains a library of trained speech recognition templates. These templates may be in the form of well known allophones, triphonemes, or individual phoneme-level HMMs. In this case, the templates will correspond to the names of individuals or destinations serviced by network server 170. As known in the art, one or more sequences of phonemes may be used to represent a set of orthographic letters of a particular name or destination. A directory consistent with this description and compatible with the present invention is described in Bielby et al., which is hereby incorporated by reference.

After comparing the feature signal with the set of phoneme-level sequences stored in directory 180, network server 170 retrieves the phoneme sequence that best matches the received feature signal. (Step 340) One technique that may be used for the comparison and phoneme sequence retrieval steps is described in U.S. Pat. No. 5,515,475 (Gupta et al.), which is hereby incorporated by reference. Gupta et al. discloses a two-pass speech recognition technique that returns a phoneme sequence that bests matches an input feature signal.

Next, the speech recognition process retrieves an orthographic letter sequence that best matches the phoneme sequence. (Step 345) This orthographic letter sequence will represent a name in the template directory 180, with the phoneme-level templates acting as an intermediary between the orthographic letter sequence and the received feature signal. Network server 170 then performs a database look-up to select a number corresponding orthographic letter sequence, or name, retrieved. (Step 350) As part of its standard network functions, network server 170 will contain, or be coupled to, a second directory that contains names and corresponding numbers serviced by the telephone system. The database look-up (Step 350) uses this second database to match the name recognized by the speech processor with a number in the directory. After selecting and retrieving the corresponding number, network server 170 automatically dials the number (Step 355), thereby completing procedure 300.

Figure 4:
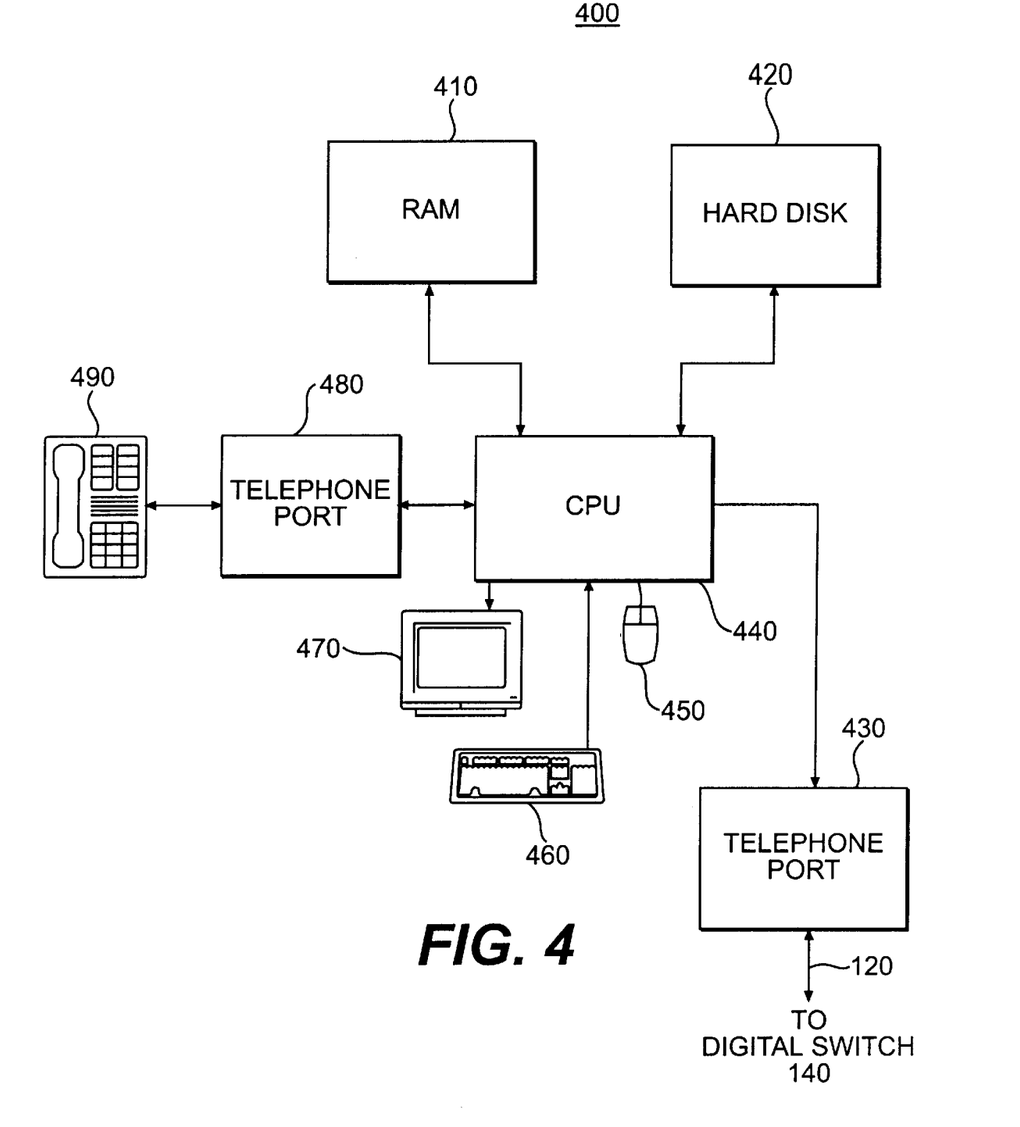
FIG. 4 is a block diagram showing an alternate embodiment of a voice-activated dialing system consistent with present invention.

FIG. 4 shows another embodiment in which the voice-activated dialing system according to the present invention may be implemented. System 400 includes hardware for a standard personal computer (for example, an IBM compatible personal computer), together with some additions related to telephony, and an ordinary telephone 490.

System 400 consists of RAM 410, hard disk 420, telephone port 430, Central Processor Unit (CPU) 440, mouse 450, keyboard 460, video display 470, and telephone port 480. These components may be standard off-the-shelf hardware. For example, CPU 440 may be a Pentium processor, and video display 470 may be a NEC MultiSync 3V monitor. Telephone port 430 connects microprocessor 440 to a public switched telephone network, and telephone port 480 connects microprocessor to telephone 490.

Telephone 490 may be used to interface the user with CPU 440 within the personal computer. In this embodiment, CPU 440 will have access to software and the same capabilities of the ADC 220 and DSP 230 as described above.

Alternatively, telephone port 480 and telephone 490 may be replaced by a microphone and speaker connected directly to microprocessor 440 via appropriate DACs, ADCs and amplifiers. In this configuration, the microphone and speaker would be used for voice-dialing and data input.

When a user picks up the handset of telephone 490 and initiates voice-dialing, CPU 440 executes software for the analog to digital conversion (Step 310), feature extraction (Step 315), signal compression (Step 320), and transmission (Step 325) steps of procedure 300. The remaining steps of procedure 300 are performed by network server 170, as described in detail above.

D. Conclusion

Voice-activated dialing systems and methods consistent with the present invention can improve efficiency and cost effectiveness by performing a feature extraction procedure locally at the telephone terminal. The signal produced by the feature extraction process can be transmitted "in-band" over a lower data rate control, or signaling, channel of the telephone system. In addition, transmission of the feature signal in-band permits T1 or DS30 interfaces to be eliminated from the process because call set-up between the user and the remote processor is not required to initiate speech recognition. Systems and methods consistent with the present invention can thus provide a user with the benefits of voice-activated dialing without the expense and equipment requirements needed to perform a complete speech recognition process and in addition, can eliminate system hardware normally required to implement remote speech recognition.

The foregoing description of the invention has been presented for purposes of illustration and description. It is not intended to be exhaustive or to limit the precise form disclosed. Modifications and variations are possible and apparent to those skilled in the art from consideration of the specification and practice of the disclosed embodiments. The specification and examples are exemplary only, and the true scope and spirit of the invention is defined by the following claims and their equivalents.

What is claimed:

1. A voice-activated dialing method, comprising the steps of:
   receiving, at a telephone terminal, an audio signal corresponding to a desired destination;
   locally conditioning the audio signal to extract a set of semantic feature characteristics;
   locally forming a feature signal representing the set of semantic feature characteristics corresponding to the received audio signal;
   transmitting the feature signal via a control channel to a remote speech recognition processor;
   retrieving, with the remote speech recognition processor, a name corresponding to the feature signal;
   retrieving a telephone number corresponding to the retrieved name; and
   automatically dialing the number retrieved.

2. The method of claim 1, wherein the step of locally conditioning the audio signal includes the substeps of:
   converting the audio signal from an analog signal to digital signal; and
   extracting the set of semantic feature characteristics from the digital signal.

3. The method of claim 1, wherein the step of locally forming the feature signal includes the substep of compressing the set of extracted semantic feature characteristics for transmission over the control channel.

4. The method of claim 3, wherein the step of locally compressing includes the substep of:
   compressing the set of extracted semantic feature characteristics to a bandwidth under 8 Kbps.

5. The method of claim 3, wherein the step of locally compressing includes the substep of:
   compressing the set of extracted semantic feature characteristics to a bandwidth under 16 Kbps.

6. The method of claim 1, wherein the remote speech recognition processor includes a directory of names, represented by a sequence of phonemes, and wherein the step of retrieving the name includes the substep of
   comparing the feature signal with the sequence of phonemes to identify at least one of the sequence of phonemes that best matches the feature signal.

7. The method of claim 1, wherein the remote speech recognition processor includes a directory of names, wherein the names in the directory are represented by a sequence of orthographic letters, and wherein the step of retrieving the name includes the substep of
   comparing the feature signal with the names in the directory using a phoneme-level representation of the names as an intermediary to identify the phoneme-level representation that best matches the feature signal.

8. A voice-activated dialing method comprising the steps of:
   receiving via a control channel, at a remote speech recognition processor, a feature signal representing an audio signal;
   comparing the received feature signal with a plurality of semantic feature characteristic sets;
   selecting at least one of the plurality of semantic feature characteristic sets that best matches the received feature signal;
   retrieving a name corresponding to the selected semantic feature characteristic set;
   selecting a telephone number corresponding to the retrieved name; and
   automatically dialing the selected telephone number.

9. The method of claim 8, wherein the remote speech recognition processor includes a directory of names, represented by a sequence of phonemes, and wherein the step of retrieving the name includes the substep of
   comparing the feature signal with the sequence of phonemes to identify at least one of the sequence of phonemes that best matches the feature signal.

10. The method of claim 8, wherein the remote speech recognition processor includes a directory of names, wherein the names in the directory are represented by a sequence of orthographic letters, and wherein the step of retrieving the name includes the substep of
    comparing the received feature signal with the names in the directory using a phoneme-level representation of the names as an intermediary to identify the phoneme-level representation that best matches the feature signal.

11. A method in a voice-activated calling system comprising the steps of:
    receiving, at telephone terminal, an audio signal corresponding to a desired destination;
    conditioning, locally at the telephone terminal, the audio signal to extract a set of semantic feature characteristics;
    forming, locally at the telephone terminal, a feature signal representing the set of semantic feature characteristics corresponding to of the audio signal; and
    transmitting the feature signal via a control channel to a remote speech recognition processor.

12. The method of claim 11, wherein the step of conditioning includes the substeps of
    converting the audio signal from an analog to digital signal; and
    extracting the set of semantic feature characteristics from the digital signal.

13. The method of claim 11, wherein the step of forming the feature signal includes the substep of
    compressing the set of extracted semantic feature characteristics for transmission over the control channel.

14. The method of claim 13, wherein the step of compressing includes the substep of
    compressing the set of extracted semantic feature characteristics to a bandwidth under 8 Kbps.

15. The method of claim 13, wherein the step of compressing includes the substep of
compressing the set of extracted semantic feature characteristics to a bandwidth under 16 Kbps.

16. A voice-activated calling system comprising:
a telephone terminal for receiving an audio signal corresponding to a destination;
means, coupled to the telephone terminal, for locally conditioning the audio signal to extract a set of semantic feature characteristics;
means, connected to means for locally conditioning, for locally forming a feature signal representing the set of semantic feature characteristics of the received audio signal;
means, connected to the means for locally forming, for transmitting the feature signal via a control channel; and
means, connected to the means for transmitting, for retrieving a name corresponding to a received feature signal.

17. The system of claim 16, wherein means for locally conditioning further includes
means for converting the audio signal to a digital signal; and
means, coupled to means for converting, for extracting a set of feature characteristics from the digital signal.

18. The system of claim 16, wherein the means for locally forming further includes
means for compressing the extracted set of feature characteristics for transmission over the control channel.

19. The system of claim 18, wherein means for compressing includes
means for compressing the set of extracted semantic feature characteristics to a bandwidth under 8 Kbps.

20. The system of claim 18, wherein means for compressing includes
means for compressing the set of extracted semantic feature characteristics to a bandwidth under 16 Kbps.

21. The system in claim 16, further including
means, connected to means for receiving, for storing a plurality of names and corresponding numbers;
means for selecting a number from means for storing, wherein the number selected corresponds to the name retrieved by means for retrieving; and
means for automatically dialing the number selected.

22. The system of claim 16, wherein means for retrieving includes a remote speech processor, and wherein the remote speech processor includes
means, connected to means for transmitting, for receiving the feature signal;
a directory of speech recognition templates, wherein the templates include a sequence of phonemes corresponding to orthographic letters of the names in means for storing; and
means, coupled to the directory, for comparing the received feature signal with the sequence of phonemes to identify at least one of the sequence of phonemes that best matches the feature signal.

23. The system of claim 16, wherein means for retrieving includes a remote speech processor, and wherein the remote speech processor includes
means, connected to means for transmitting, for receiving the feature signal;
a directory of names, wherein the names in the directory are represented by a sequence of tri-phonemes corresponding to orthographic letters of the names in the directory; and
means, coupled to the directory, for comparing the feature signal with the sequence of tri-phonemes to identify at least one of the sequence of tri-phonemes that best matches the feature signal.

24. A telephone terminal apparatus comprising:
means for receiving an audio signal corresponding to a desired destination;
means for locally conditioning the audio signal to extract a set of semantic feature characteristics;
means for locally forming a feature signal corresponding to the extracted set of semantic feature characteristics; and
means for transmitting the feature signal to a remote speech recognition processor via a control channel.

25. The terminal of claim 24, wherein means for locally conditioning further includes:
means for converting the audio signal to a digital signal; and
means for extracting a set of semantic feature characteristics from the digital signal.

26. The system of claim 24, wherein means for locally forming further includes:
means for compressing the extracted set of semantic feature characteristics for transmission over the control channel.

27. The terminal of claim 26, wherein means for compressing includes
means for compressing the set of extracted semantic feature characteristics to a bandwidth under 8 Kbps.

28. The terminal of claim 26, wherein means for compressing includes
means for compressing the set of extracted semantic feature characteristics to a bandwidth under 16 Kbps.

* * * * *